(12) United States Patent
Sakuma et al.

(10) Patent No.: US 9,243,909 B2
(45) Date of Patent: Jan. 26, 2016

(54) MODULE AND ELECTRONIC APPARATUS

(75) Inventors: Masayasu Sakuma, Kamiina (JP); Yoshihiro Kobayashi, Komagane (JP); Shojiro Kitamura, Suwa (JP); Taketo Chino, Hokuto (JP); Michiharu Ogami, Sakata (JP)

(73) Assignee: Seiko Epson Corporation (JP)

( * ) Notice: Subject to any disclaimer, the term of this patent is extended or adjusted under 35 U.S.C. 154(b) by 191 days.

(21) Appl. No.: 13/478,619

(22) Filed: May 23, 2012

(65) Prior Publication Data

US 2012/0304765 A1 Dec. 6, 2012

(30) Foreign Application Priority Data

May 31, 2011 (JP) ................. 2011-122790

(51) Int. Cl.
*G01P 1/02* (2006.01)
*G01C 19/5783* (2012.01)
*G01D 11/24* (2006.01)
*G01P 15/18* (2013.01)

(52) U.S. Cl.
CPC .......... *G01C 19/5783* (2013.01); *G01D 11/245* (2013.01); *G01P 1/02* (2013.01); *G01P 1/023* (2013.01); *G01P 1/026* (2013.01); *G01P 15/18* (2013.01)

(58) Field of Classification Search
CPC .......... G01P 1/02; G01P 1/023; G01P 1/026; G01D 11/245
See application file for complete search history.

(56) References Cited

U.S. PATENT DOCUMENTS

| 5,233,871 | A | 8/1993 | Schwarz et al. |
|---|---|---|---|
| 6,738,721 | B1 | 5/2004 | Drücke et al. |
| 7,040,922 | B2 | 5/2006 | Harney et al. |
| 7,291,023 | B1 | 11/2007 | Still et al. |
| 8,605,919 | B2 * | 12/2013 | Awamura et al. ............. 381/174 |
| 2003/0011980 | A1 | 1/2003 | Albrecht et al. |
| 2008/0100732 | A1 | 5/2008 | Minamio et al. |
| 2008/0117324 | A1 | 5/2008 | Minamio et al. |
| 2008/0144302 | A1 | 6/2008 | Rosenblatt |
| 2008/0152272 | A1 * | 6/2008 | Debrailly et al. ............. 384/448 |
| 2009/0056446 | A1 * | 3/2009 | Cluff et al. ................. 73/514.16 |
| 2009/0095510 | A1 | 4/2009 | Ono et al. |
| 2009/0255335 | A1 | 10/2009 | Fly et al. |

(Continued)

FOREIGN PATENT DOCUMENTS

| CN | 101109634 A | 1/2008 |
|---|---|---|
| CN | 101416302 A | 4/2009 |

(Continued)

OTHER PUBLICATIONS

Extended European Search Report for Application No. 12 16 9761 mailed Oct. 17, 2012 (5 pages).

(Continued)

*Primary Examiner* — Paul West
(74) *Attorney, Agent, or Firm* — Harness, Dickey & Pierce, P.L.C.

(57) ABSTRACT

A module includes a sensor device, a mounting substrate that has a plurality of mounting faces, a portion between the mounting faces adjacent to each other being foldable, a supporting member having fixing faces, wherein the sensor device is mounted on at least one of the mounting faces, each of the mounting faces is disposed along each of the fixing faces, and the sensor device is disposed on the supporting member side.

11 Claims, 9 Drawing Sheets

(56) References Cited

U.S. PATENT DOCUMENTS

| | | |
|---|---|---|
| 2009/0283891 A1 | 11/2009 | Dekker et al. |
| 2009/0303204 A1 | 12/2009 | Nasiri et al. |
| 2009/0308157 A1 | 12/2009 | Eriksen et al. |
| 2011/0077820 A1 | 3/2011 | Tokui et al. |
| 2011/0110055 A1 | 5/2011 | Phillps et al. |
| 2011/0162452 A1 | 7/2011 | Ono et al. |
| 2011/0297745 A1 | 12/2011 | Isuyama |
| 2013/0111993 A1 | 5/2013 | Wang |

FOREIGN PATENT DOCUMENTS

| | | |
|---|---|---|
| CN | 101532840 A | 9/2009 |
| CN | 102121829 A | 7/2011 |
| JP | 05-223839 | 9/1993 |
| JP | 05-340960 | 12/1993 |
| JP | 07-306047 | 11/1995 |
| JP | 11-211481 | 8/1999 |
| JP | 11-281407 | 10/1999 |
| JP | 11-289141 | 10/1999 |
| JP | 2001-102746 | 4/2001 |
| JP | 2002-009228 | 1/2002 |
| JP | 2003-107549 A | 4/2003 |
| JP | 2005-197493 | 7/2005 |
| JP | 2007-057288 A | 3/2007 |
| JP | 2007-059701 A | 3/2007 |
| JP | 2010-192060 A | 9/2010 |
| JP | 2010-231895 A | 10/2010 |
| JP | 2011-075442 A | 4/2011 |
| WO | WO-2011-140804 A1 | 11/2011 |

OTHER PUBLICATIONS

J. Barton et al, "Design, Fabrication and Testing of Miniaturised Wireless Inertial Measurement Units (IMU)", 2007 Electronic Components and Technology Conference [pp. 1143-1148], Tyndall National Institute, Lee Maltings, Prospect Row, Cork, Ireland.

* cited by examiner

MODULE AND ELECTRONIC APPARATUS

BACKGROUND

1. Technical Field

The present invention relates to a module and an electronic apparatus.

2. Related Art

For example, a sensor unit disclosed in U.S. Pat. No. 7,040, 922 is known. The sensor unit disclosed in U.S. Pat. No. 7,040,922 is provided with a mounting member that has a rectangular parallelepiped shape and three faces orthogonal to each other, and sensor devices mounted on the three faces, respectively.

However, in the sensor unit disclosed in U.S. Pat. No. 7,040,922, the sensor devices are exposed to the outside of the sensor unit. Therefore, at the time of manufacturing the sensor units or at the time of confirming operation thereof, and at the time of a process of assembling the sensor units to other electronic apparatus, the sensor units come into direct contact with various apparatuses such as a manufacturing apparatus or with a worker, and therefore the sensor devices may be broken due to the contact and may not exhibit superior detection accuracy.

SUMMARY

An advantage of some aspects of the invention is to provide a module and an electronic apparatus that have high reliability and are small in size and thickness, and that are capable of exhibiting superior detection accuracy.

An aspect of the invention is directed to a module including a sensor device, a mounting substrate that has a plurality of mounting faces, a portion between the mounting faces adjacent to each other being foldable, a supporting member having a plurality of fixing faces, in which the sensor device is mounted on at least one of the mounting faces, each of the mounting faces is disposed along each of the fixing faces, and the sensor device is disposed on the supporting member side.

According to this configuration, breakage or the like of a sensor device at the time of manufacturing the module or at the time of confirming operation may be prevented, and therefore a module improved in reliability may be provided.

In the module according to the aspect of the invention, it is preferred that vertical lines of the fixing faces in the supporting member intersect each other.

In the module according to the aspect of the invention, it is preferred that vertical lines of the fixing faces in the supporting member are orthogonal to each other.

According to this configuration, when the sensor device is formed of, for example, an angular velocity sensor or an acceleration sensor, and the sensor device is disposed on the fixing faces that intersect each other or are orthogonal to each other, an angular velocity or acceleration around a plurality of axes may be detected with good accuracy.

In the module according to the aspect of the invention, it is preferred that the sensor device and the fixing face are bonded to each other.

According to this configuration, bonding between the mounting substrate and the supporting substrate may be strong, and therefore reliability is raised, and the sensor device is prevented from moving due to an external force. As a result, the detection accuracy may be raised.

In the module according to the aspect of the invention, it is preferred that the supporting member is a rectangular parallelepiped.

According to this configuration, each face making up the rectangular parallelepiped may be used as each fixing face, and vertical lines of the fixing faces may be easily made to be orthogonal to each other, and therefore when the sensor device is formed of, for example, the angular velocity sensor or the acceleration sensor, and the sensor device is disposed on the fixing faces, an angular velocity or acceleration around a plurality of axes may be detected with good accuracy.

In the module according to the aspect of the invention, it is preferred that the supporting member is provided with a penetration hole, and at least a part of the sensor device may be accommodated in the penetration hole.

In the module according to the aspect of the invention, it is preferred that the supporting member is provided with a clearance portion, and at least a part of the sensor device is accommodated in the clearance portion.

According to this configuration, at least a part of the sensor device may be accommodated inside the penetration hole, thereby contributing reduction in size and thickness of the module.

In the module according to the aspect of the invention, it is preferred that a protruding portion is provided to one side of the mounting face and the fixing face, and a hole portion is provided to the other side, and the protruding portion and the hole portion engage with each other.

According to this configuration, the mounting face and the fixing face may be easily bonded to each other without using an adhesive or the like.

In the module according to the aspect of the invention, it is preferred that a metallic material is used for the supporting member.

In this manner, when the supporting member is formed of a material having a high electrical conductivity like a metallic material, for example, radiation noise generated from a microcontroller mounted on the mounting face may be interrupted by the supporting member. Therefore, it is possible to prevent this radiation noise from reaching a sensor device mounted on another mounting face and having an adverse effect on the sensor device.

In the module according to the aspect of the invention, it is preferred that a hard substrate is used as the mounting faces, and a flexible substrate is connected between the mounting faces.

According to this configuration, the mounting substrate may be easily deformed, and therefore the fixing of the mounting substrate to the supporting member may be simply performed.

In the module according to the aspect of the invention, it is preferred that the mounting faces include a first mounting face, a second mounting face, and a third mounting face, and the sensor devices are mounted on the first to third mounting faces, respectively, and detection axes of the sensor devices intersect each other.

In the module according to the aspect of the invention, it is preferred that the sensor device is an angular velocity sensor or an acceleration sensor.

According to this configuration, when the sensor device is formed of the angular velocity sensor or the acceleration sensor, and the sensor device is mounted on the first to third mounting faces that intersect each other or are orthogonal to each other, a module that is capable of detecting an angular velocity or acceleration around a plurality of axes may be provided.

Another aspect of the invention is directed to an electronic apparatus including the module according to the aspect of the invention.

According to this configuration, an electronic apparatus that is capable of exhibiting excellent reliability may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a module and an electronic apparatus according to the invention will be described in detail with reference to very suitable embodiment shown in the attached drawings.

1. Module

First, a module according to an embodiment of the invention will be described.

First Embodiment

Figure 1A:
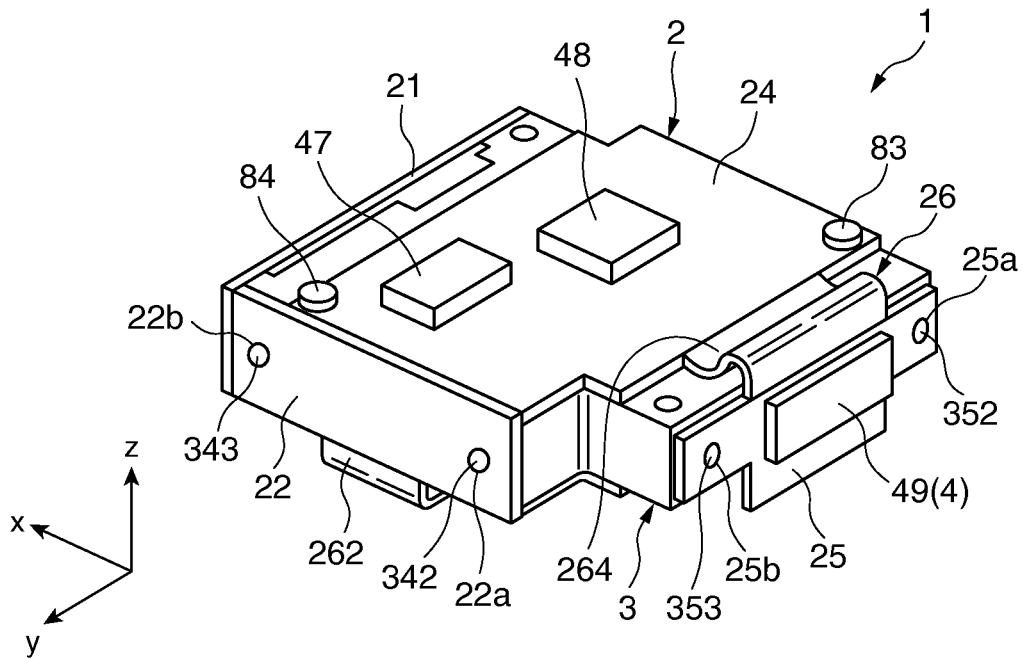
FIGS. 1A and 1B are perspective views illustrating a first embodiment of a module according to the invention.
Figure 1B:
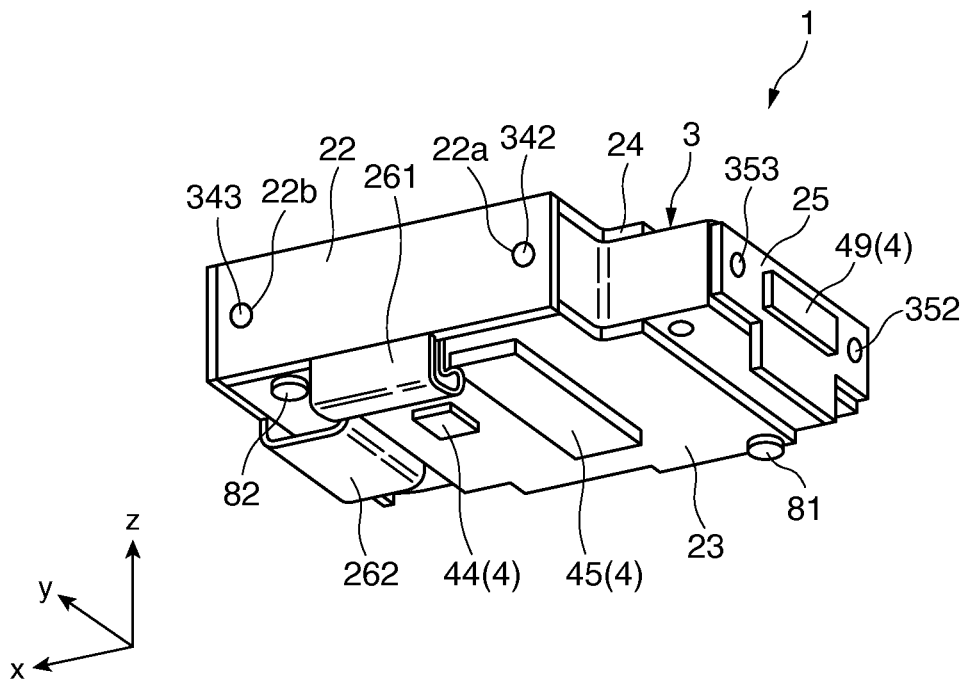
Figure 2A:
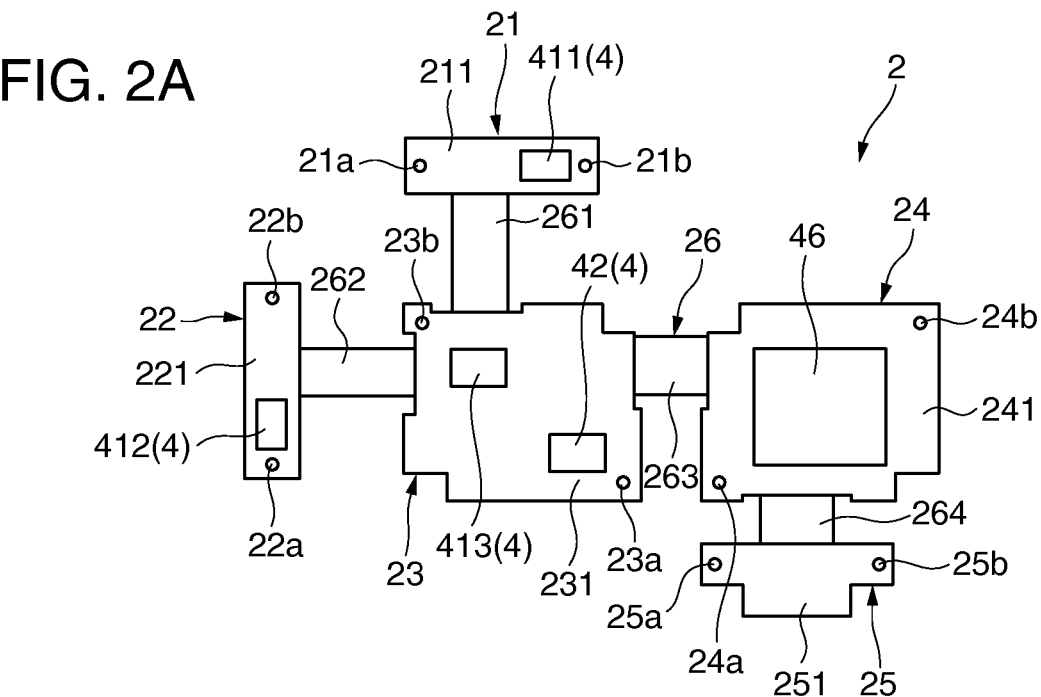
FIGS. 2A and 2B are development views of a mounting substrate provided to the module shown in FIGS. 1A and 1B.
Figure 2B:
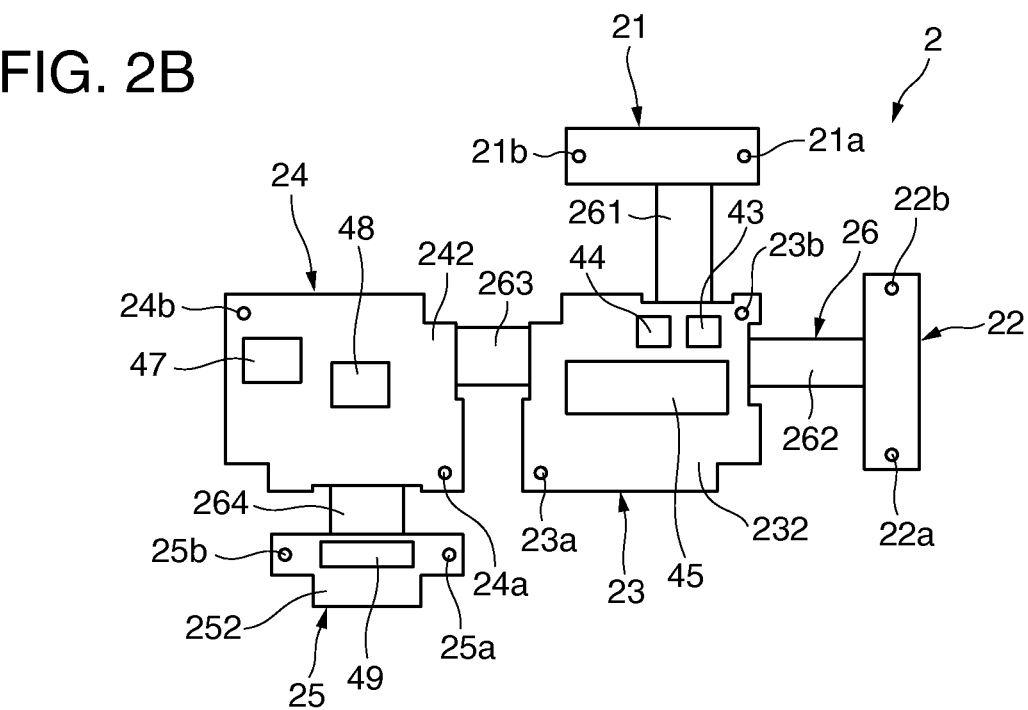
Figure 3:
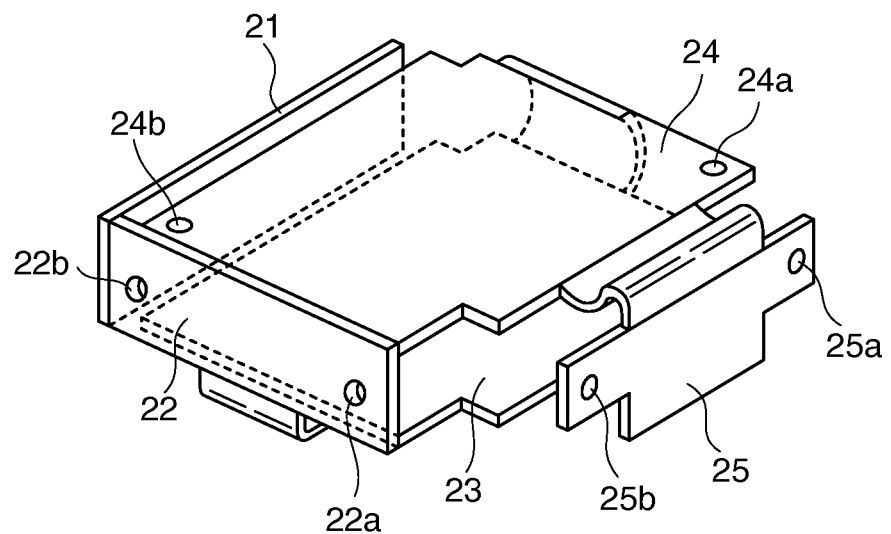
FIG. 3 is a perspective view illustrating a state in which the mounting substrate shown in FIGS. 2A and 2B is assembled.
Figure 4:
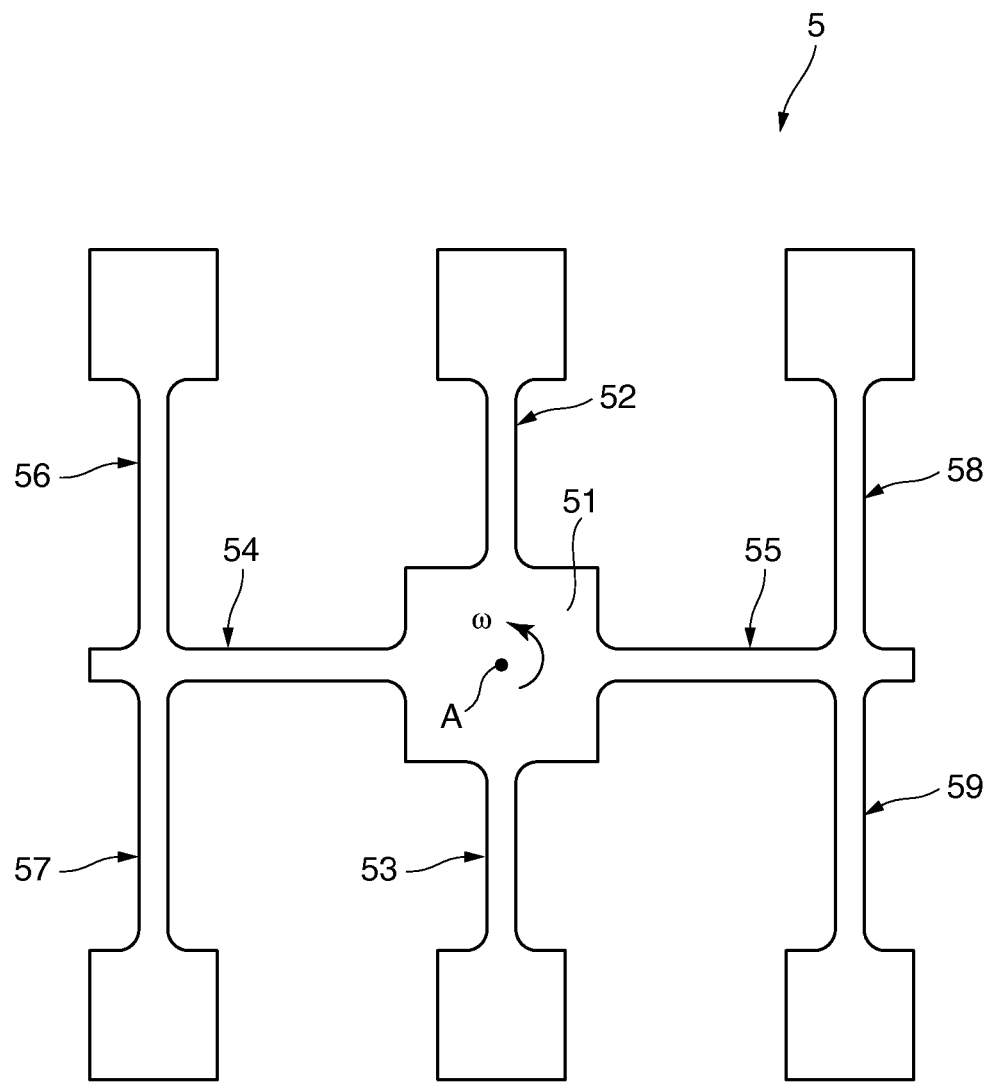
FIG. 4 is a plan view illustrating an example of an angular velocity sensor provided to the module shown in FIGS. 1A and 1B.
Figure 5A:
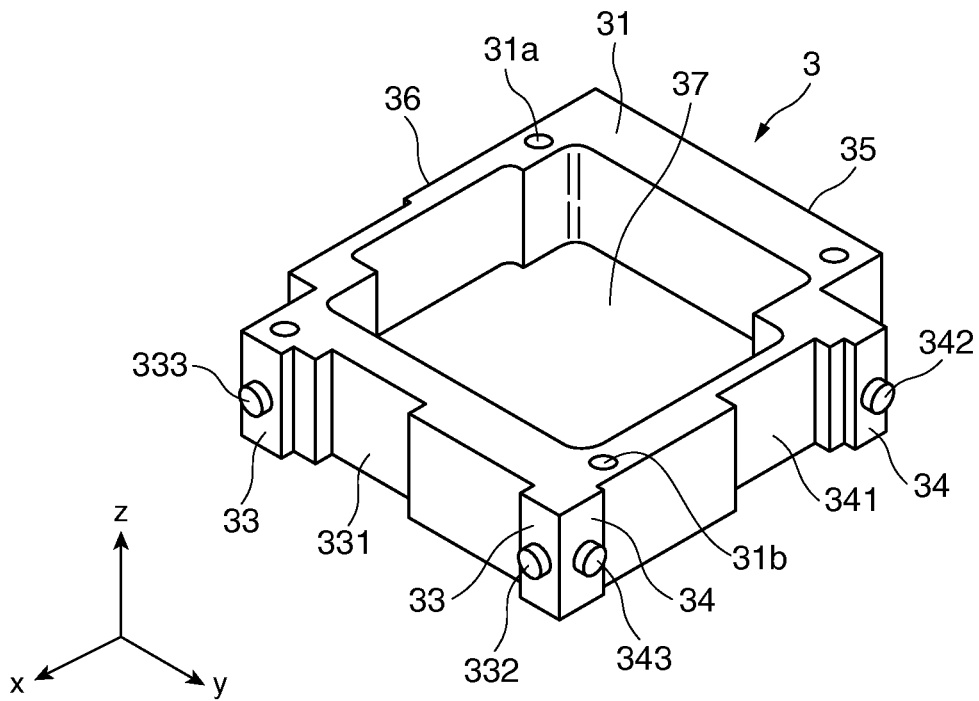
FIGS. 5A and 5B are perspective views illustrating a supporting member provided to the module shown in FIGS. 1A and 1B.
Figure 5B:
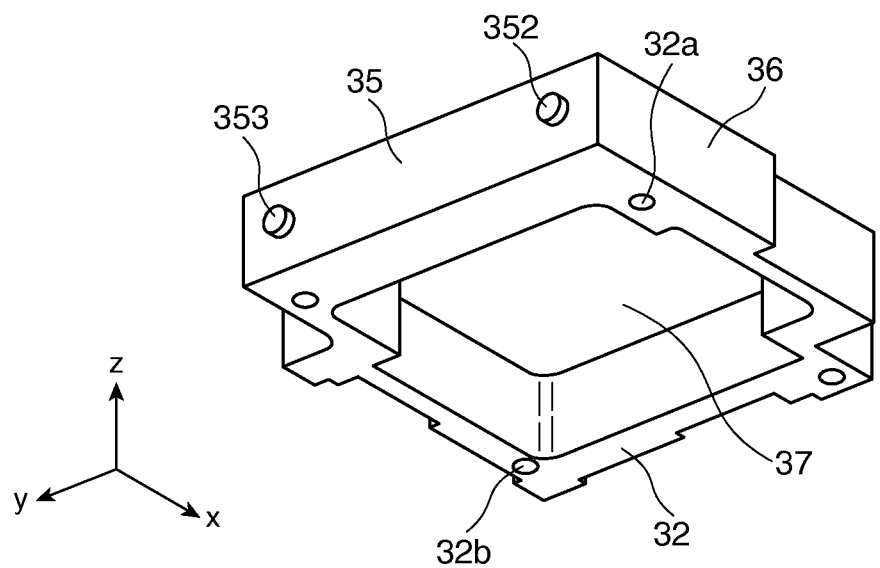
Figure 6:
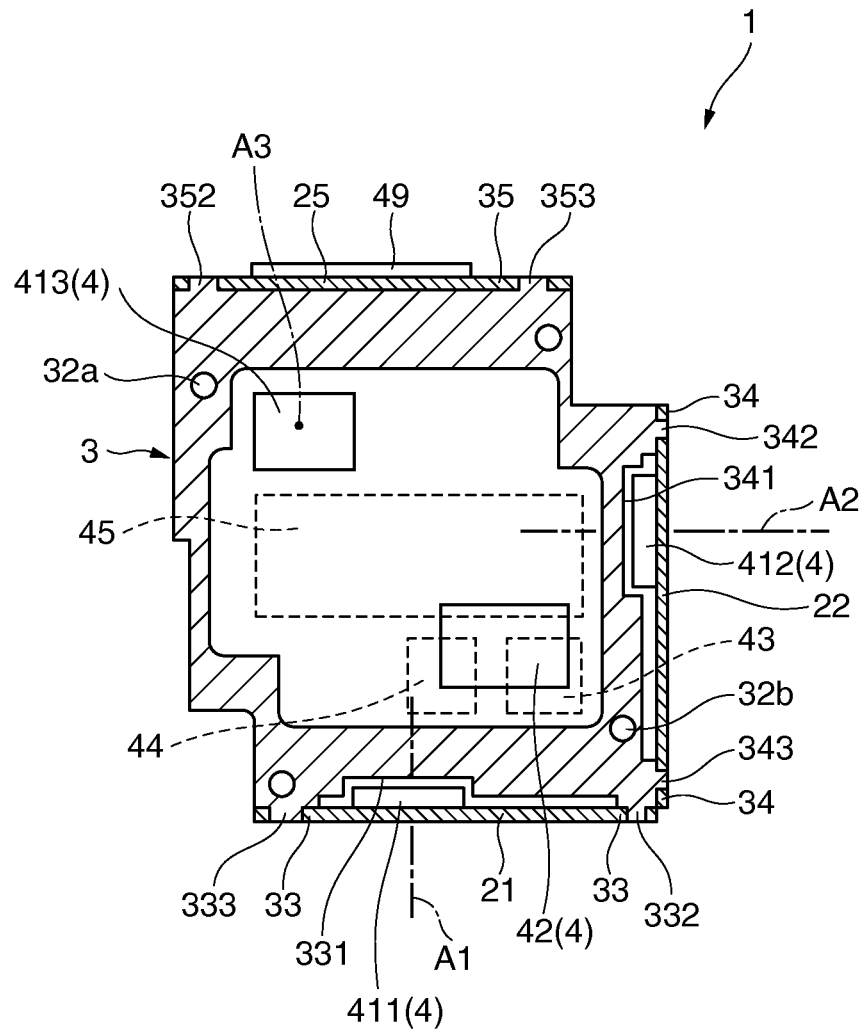
FIG. 6 is a transverse cross-sectional view illustrating the module shown in FIGS. 1A and 1B.
Figure 6:
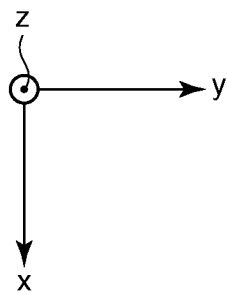

FIGS. 1A and 1B show perspective views illustrating a first embodiment of a module according to the invention, FIGS. 2A and 2B show development views of a mounting substrate provided to the module shown in FIGS. 1A and 1B, FIG. 3 shows a perspective view illustrating a state in which the mounting substrate shown in FIGS. 2A and 2B is assembled, FIG. 4 shows a plan view illustrating an example of an angular velocity sensor provided to the module shown in FIGS. 1A and 1B, FIGS. 5A and 5B show perspective views illustrating a supporting member provided to the module shown in FIGS. 1A and 1B, and FIG. 6 shows a transverse cross-sectional view illustrating the module shown in FIGS. 1A and 1B. In addition, in FIGS. 1A and 1B, FIG. 3, and FIGS. 5A and 5B, an upper side in the drawings is described as "upper", and a lower side in the drawings is described as "lower" in the following description for convenience of description. In addition, as shown in FIGS. 1A and 1B, three axes that are orthogonal to each other are referred to as "x-axis", "y-axis", and "z-axis".

The module 1 according to this embodiment includes angular velocity sensors 411 to 413 as each sensor device 4, and is a three-axis gyro sensor module that is capable of detecting each angular velocity around an x-axis, a y-axis, and a z-axis that are orthogonal to each other. This module 1 is excellent in convenience and may be appropriately used for, for example, a motion trace, a motion tracking, a motion controller, a pedestrian dead reckoning (PDR), or the like.

As shown in FIGS. 1A and 1B, the module 1 includes a mounting substrate 2 on which sensor devices 4 such as angular velocity sensors 411 to 413 are mounted, and a supporting member 3 that supports (fixes) the mounting substrate 2. In addition, the module 1 may further include a casing that accommodates the mounting substrate 2 and the supporting member 3. Hereinafter, these members are sequentially described.

Mounting Substrate

The mounting substrate 2 is a rigid and flexible substrate in which a rigid substrate (hard substrate), which is hard and therefore is difficult to deform, and a flexible substrate, which is soft and therefore is easy to be deformed, are combined. As this mounting substrate 2, for example, a known rigid and flexible substrate in which a hard layer such as a glass epoxy substrate is adhered to both sides of a flexible substrate and this hard layer is used as the rigid substrate may be used.

Here, FIG. 2A shows a plan view taken when a developed mounting substrate 2 is seen from one face side thereof, and FIG. 2B shows a plan view taken when the developed mounting substrate 2 is seen from a face side opposite to FIG. 2A.

As shown in FIGS. 2A and 2B, the mounting substrate 2 includes a first rigid substrate 21, a second rigid substrate 22, a third rigid substrate 23, a fourth rigid substrate 24, and a fifth rigid substrate 25 that are disposed to be spaced from each other, and a flexible substrate 26 that connects these substrates.

The flexible substrate 26 includes a connecting portion 261 that connects the first rigid substrate 21 and the third rigid substrate 23, a connecting portion 262 that connects the second rigid substrate 22 and the third rigid substrate 23, a connecting portion 263 that connects the third rigid substrate 23 and the fourth rigid substrate 24, and a connecting portion 264 that connects the fourth rigid substrate 24 and the fifth rigid substrate 25.

In addition, hole portions 21a and 21b are formed at both ends of the first rigid substrate 21, respectively, hole portions 22a and 22b are formed at both ends of the second rigid substrate 22, respectively, hole portions 23a and 23b are formed at both ends (both corner portions that are in a diagonal relationship) of the third rigid substrate 23, respectively, hole portions 24a and 24b are formed at both ends (both corner portions that are in a diagonal relationship) of the fourth rigid substrate 24, respectively, hole portions 25a and 25b are formed at both ends of the fifth rigid substrate 25, respectively. These hole portions 21a to 25b are used to fix the rigid substrates 21 to 25 to the supporting member 3. In addition, the hole portions include both a structure that penetrates from one face to another face, and a structure in which an opening is provided on one face and which does not penetrate to another face.

In addition, the respective rigid substrates 21 to 25 and the flexible substrate 26 have a conductor pattern (not shown), and the plurality of sensor devices 4 are electrically connected in an appropriate manner through this conductor pattern.

In addition, in the following description, for convenience of description, a face of each of the rigid substrates 21 to 25, which is shown in FIG. 2A, is referred to as a "front-side mounting face", and a face shown in FIG. 2B is referred to as a "rear-side mounting face".

The mounting substrate 2 may be deformed into a rectangular parallelepiped shape shown in FIG. 3 by folding the respective connecting portions 261 to 264 of the flexible substrate 26. Specifically, when the connecting portions 261 to 264 are folded (curved) in a manner such that the front-side mounting faces 211 to 251 of the respective rigid substrates 21 to 25 face an inner side, the mounting substrate 2 may be deformed into a rectangular parallelepiped state in which adjacent rigid substrates are orthogonal to each other. In this state, when the third rigid substrate 23 is set as a bottom face, the fourth rigid substrate 24 makes up a top face, and each of the first, second, and fifth rigid substrates 21, 22, and 25 makes up a side face. As shown in FIGS. 1A and 1B, the mounting substrate 2 is fixed to the supporting member 3 in this deformed state. In other words, the mounting substrate 2 is designed so as to be deformed into a shape corresponding to the supporting member 3.

Hereinbefore, description has been made with respect to the mounting substrate 2. When the mounting substrate 2 is configured by the above-described rigid and flexible substrate, the mounting substrate 2 may be easily deformed, such that the fixing of the mounting substrate 2 to the supporting member 3 may be simple. In addition, the respective rigid substrates 21 to 25 are collectively connected, such that in this regard, the fixing of the mounting substrate 2 to the supporting member 3 may be simply and smoothly performed. In addition, when the sensor devices 4 are mounted on the rigid substrate, unnecessary vibration of the sensor devices 4 (particularly, the angular velocity sensors 411 to 413) may be suppressed and thereby detection accuracy of the module 1 may be improved.

In addition, a ground layer (not shown) is formed in the mounting substrate 2, such that this ground layer exhibits a function of interrupting an external magnetic field. Therefore, in a state shown in FIG. 3, an effect due to the external magnetic field may be excluded with respect to the sensor devices 4 (sensor devices 4 mounted on the front-side mounting surfaces 211 to 251) that are positioned inside the mounting substrate 2.

Sensor Device

As shown in FIGS. 2A and 2B, the plurality of the sensor devices 4 are mounted on the mounting substrate 2.

As the sensor devices 4, the three angular velocity sensors 411 to 413 of one-axis detection type, and the acceleration sensor 42 of three-axis detection type are mounted on the mounting substrate 2. In addition, a power supply circuit 43 that drives the sensor devices 4 (the angular velocity sensors 411 to 413 and the acceleration sensor 42) or the like, an amplifying circuit 44 that amplifies an output signal from the sensor devices 4, an analog/digital converting circuit 45 that converts an analog signal amplified by the amplifying circuit 44 to a digital signal, a microcontroller 46 that performs a desired control, a nonvolatile memory 47 such as an EEPROM, an orientation sensor (magnetic sensor) 48 that detects orientation, and a connector (interface connector) 49 that outputs a signal are mounted on the mounting substrate 2.

Hereinafter, disposition of these sensor devices 4 and the electronic components will be described in detail.

First Rigid Substrate 21

The angular velocity sensor 411 that detects an angular velocity around the x-axis is mounted on the front-side mounting face 211 of the first rigid substrate 21.

Second Rigid Substrate 22

The angular velocity sensor 412 that detects an angular velocity around the y-axis is mounted on the front-side mounting face 221 of the second rigid substrate 22.

Third Rigid Substrate 23

The angular velocity sensor 413 that detects an angular velocity around the z-axis and the acceleration sensor 42 are mounted on the front-side mounting face 231 of the third rigid substrate 23. In addition, the power supply circuit 43, the amplifying circuit 44, and the analog/digital converting circuit 45 are mounted on the rear-side mounting face 232 of the third rigid substrate 23. In addition, the angular velocity sensor 413 and the acceleration sensor 42 may be mounted on the rear-side mounting face 232, and the power supply circuit 43, the amplifying circuit 44, and the analog/digital converting circuit 45 may be mounted on the front-side mounting face 231.

Here, the analog/digital converting circuit 45 has a size larger than that of other electronic components (the power supply circuit 43 and the amplifying circuit 44) that are mounted on the rear-side mounting face 232. Therefore, it is preferable that the analog/digital converting circuit 45 be disposed at a central portion of the rear-side mounting face 232. Due to this configuration, the analog/digital converting circuit 45 may be effectively used as a reinforcing member that augments the strength of the third rigid substrate 23. Therefore, not-intended vibration caused by bending deformation of the third rigid substrate 23 is suppressed, and therefore unnecessary vibration is not transmitted to the angular velocity sensors 411 to 413, and angular velocity detection accuracy by the angular velocity sensors 411 to 413 (particularly, the angular velocity sensor 413 mounted on the third rigid substrate 23) is raised.

In addition, it is preferable that the acceleration sensor 42 be disposed at an edge portion of the front-side mounting face 231 (particularly, in the vicinity of either the hole portion 23a or the hole portion 23b. However, a portion overlapping the bottom face 32 of the supporting member 3 is excluded). As described later, the third rigid substrate 23 is supported by the bottom face 32 of the supporting member 3 at the edge portion thereof, and is fixed to the supporting member 3 by being screw-coupled thereto with the hole portions 23a and 23b interposed therebetween. As a result, the edge portion of the third rigid substrate 23 is difficult to deform and the unnecessary vibration is hard to occur. Therefore, when the acceleration sensor 42 is disposed at this place, the acceleration may be detected with relatively high accuracy.

Fourth Rigid Substrate 24

The microcontroller 46 is mounted on the front-side mounting face 241 of the fourth rigid substrate 24, and the nonvolatile memory 47 and the orientation sensor 48 are mounted on the rear-side mounting face 242.

Here, the microcontroller 46 has a size larger than that of other electronic component (the nonvolatile memory 47 and the orientation sensor 48) mounted on the fourth rigid substrate 24. Therefore, it is preferable that the microcontroller 46 be disposed at a central portion of the front-side mounting face 241. Due to this configuration, the microcontroller 46 may be effectively used as a reinforcing member that augments the strength of the fourth rigid substrate 24. Therefore, unnecessary vibration caused by bending deformation of the fourth rigid substrate 24 is suppressed, and therefore unnecessary vibration is not transmitted to the angular velocity sensors 411 to 413, and angular velocity detection accuracy by the angular velocity sensors 411 to 413 is raised.

In addition, radiation noise generated from the microcontroller 46 is interrupted by the ground layer of the fourth rigid substrate 24, such that when the orientation sensor 48 is mounted on a mounting face that is opposite to the microcontroller 46, it is possible to prevent the radiation noise from reaching the orientation sensor 48 and having an adverse effect on the orientation sensor 48. Therefore, the detection accuracy of the orientation sensor 48 may be improved.

Fifth Rigid Substrate 25

A connector 49 is mounted on a rear-side mounting face 252 of the fifth rigid substrate 25.

Hereinbefore, the description has been made in detail with respect to the disposition of the sensor devices 4 and the electronic components.

In the mounting substrate 2, analog circuits including the power supply circuit 43, the amplifying circuit 44, and the analog/digital converting circuit 45 are collectively provided in the third rigid substrate 23, a digital circuit including the microcontroller 46 is collectively provided in the fourth rigid substrate 24. Therefore, the propagation of a high-frequency noise generated due to the digital circuit into the analog circuits may be suppressed and therefore excellent reliability and detection accuracy may be exhibited.

The angular velocity sensors 411 to 413 are not particularly limited as long as the angular velocity may be detected, and an angular velocity sensor of known one axis detection type may be used. As these angular velocity sensors 411 to 413, for example, a sensor provided with a vibrating piece 5 shown in FIG. 4 may be used.

The vibrating piece 5 is formed of quartz (piezoelectric material). In addition, the vibrating piece has a base portion 51, a pair of vibrating arms 52 and 53 for detection, which extends in the vertical direction on a plane of paper from both sides of the base portion 51, a pair of connecting arms 54 and 55 that extends in the horizontal direction on the plane of paper from both side of the base portion 51, and respective pairs of vibrating arms 56, 57, 58, and 59 for driving, which extends in the vertical direction on the plane of paper from both sides of distal ends of the respective connecting arms 54 and 55. In addition, a detection electrode (not shown) is formed on a surface of each of the vibrating arms 52 and 53 for detection, and a driving electrode (not shown) is formed on a surface of each of the vibrating arm 56, 57, 58, and 59 for driving.

In this vibrating piece 5, in a state in which when a voltage is applied to the driving electrode and thereby the vibrating arms 56 and 58 for driving and the vibrating arms 57 and 59 for driving are made to vibrate so as to repeat approaching and separation to and from each other, when an angular velocity $\omega$ around a normal line (detection axis) A of the vibrating piece 5 is applied, a Coriolis force is applied to the vibrating piece 5 and the vibration of the vibrating arms 52 and 53 for detection is excited. In addition, the angular velocity applied to the vibrating piece 5 may be obtained by detecting strain of the vibrating arms 52 and 53 for detection, which is generated due to vibration of the vibrating arms 52 and 53 for detection, using the detection electrode.

Supporting Member

As shown in FIGS. 5A and 5B, and FIG. 6, the supporting member 3 has a substantially rectangular parallelepiped shape, and has a top face 31 and a bottom face 32 disposed to be opposite to each other, and four side faces 33, 34, 35, and 36 that connect the top face 31 and the bottom face 32. In the supporting member 3, at least the bottom face 32, the side face 33, and the side face 34 are accurately formed in order for vertical line thereof to be orthogonal to each other.

As described later, the side face 33, the side face 34, and the bottom face 32 are faces to fix the first to third rigid substrates 21 to 23 on which the angular velocity sensors 411 to 413 are mounted, such that when these three faces are formed to be orthogonal to each other, the angular velocity sensors 411 to 413 may be accurately disposed with respect to the respective axes of the x-axis, the y-axis, and the z-axis. Therefore, according to the module 1, the angular velocity around the respective axes may be detected with high accuracy.

Side Face 33

The side face 33 makes up a fixing face (a first fixing face) that fixes the first rigid substrate 21. The first rigid substrate 21 is fixed to the side face 33 in a state the front-side mounting face 211 faces the supporting member 3 side (an inner side). Specifically, the supporting member 3 has two protrusions 332 and 333 that protrude from both end of the side face 33. The hole portions 21a and 21b formed in the first rigid substrate 21 engage with the protrusions 332 and 333, and therefore the first rigid substrate 21 is fixed to the side face 33.

In this manner, by using two protrusions 332 and 333, the first rigid substrate 21 may be fixed to the side face 33 while performing positioning of the first rigid substrate 21 with respect to the side face 33. Particularly, when the protrusions 332 and 333 are formed on both ends of the side face 33, a spaced distance between the protrusions 332 and 333 is lengthened, and therefore the positioning of the first rigid substrate 21 may be performed with good accuracy.

It is preferable that in the fixing of the first rigid substrate 21 to the side face 33, adhesion using adhesive be used together. Due to this configuration, the first rigid substrate 21 may be strongly fixed to the side face 33. This is true of the second to fifth rigid substrates 22 to 25 described later.

In addition, the supporting member 3 has a clearance portion 331 in the side face 33. This clearance portion 331 is formed in accordance with a position and an exterior appearance of the angular velocity sensor 411, and in a state in which the first rigid substrate 21 is fixed to the side face 33, the angular velocity sensor 411 is accommodated in the clearance portion 331. That is, the clearance portion 331 may function as a clearance portion that prevents the supporting member 3 and the angular velocity sensor 411 from being brought into contact with each other.

In addition, a zenith face (face opposite to a face on which the first rigid substrate 21 is mounted) of the sensor device 4 and a surface of the clearance portion 331 of the supporting member may be bonded with adhesive or the like. According to this configuration, the sensor device and the supporting member may be strongly bonded to each other.

When this clearance portion 331 is formed, an inner space of the supporting member 3 may be effectively utilized and therefore reduction in size of the module 1 may be promoted.

Side Face 34

The side face 34 makes up a fixing face (a second fixing face) that fixes the second rigid substrate 22. The second rigid substrate 22 is fixed to the side face 34 in a state in which the front-side mounting face 221 faces the supporting member 3 side (an inner side). Specifically, the supporting member 3 has two protrusions 342 and 343 that protrude from both end of the side face 34. The hole portions 22a and 22b formed in the second rigid substrate 22 engage with the protrusions 342 and 343, and therefore the second rigid substrate 22 is fixed to the side face 34.

In addition, the supporting member 3 has a clearance portion 341 in the side face 34. This clearance portion 341 is formed in accordance with a position and an exterior appearance of the angular velocity sensor 412, and in a state in which the second rigid substrate 22 is fixed to the side face 34, the angular velocity sensor 412 is accommodated in the clearance portion 341. That is, the clearance portion 341 may function as a clearance portion that prevents the supporting member 3 and the angular velocity sensor 412 from being brought into contact with each other.

In addition, a zenith face (face opposite to a face on which the second rigid substrate 22 is mounted) of the sensor device 4 and a surface of the clearance portion 341 of the supporting member may be bonded with adhesive or the like. According to this configuration, the sensor device and the supporting member may be strongly bonded to each other.

When this clearance portion 341 is formed, an inner space of the supporting member 3 may be effectively utilized and therefore the reduction in size of the module 1 may be promoted.

Side Face 35

The side face 35 makes up a fixing face that fixes the fifth rigid substrate 25. The fifth rigid substrate 25 is fixed to the side face 35 in a state in which the front-side mounting face 251 faces the supporting member 3 side (an inner side). That is, the fifth rigid substrate 25 is fixed to the side face 35 in a state in which the connector 49 is exposed to the outside of the module 1. Specifically, the supporting member 3 has two protrusions 352 and 353 that protrude from both end of the side face 35. The hole portions 25a and 25b formed in the fifth rigid substrate 25 engage with the protrusions 352 and 353, and therefore the fifth rigid substrate 25 is fixed to the side face 35.

In addition, in the above description, the protrusions 342, 343, 352, and 353 are provided on the supporting member 3 side, and the hole portions 22a, 22b, 25a, and 25b are provided on the rigid substrate side, but the protrusion may be provided on the rigid substrate side and the hole portions may be provided on the supporting member side.

Bottom Face 32

The bottom face 32 makes up a fixing face (a third fixing face) that fixes the third rigid substrate 23. The third rigid substrate 23 is fixed to the bottom face 32 in a state in which the front-side mounting face 231 faces the supporting member 3 side (inner side). Specifically, the supporting member 3 is provided with two screw holes 32a and 32b that are formed at two corner portions of the bottom face 32, which are in a diagonal relationship. The screw holes 32a and 32b and the hole portions 23a and 23b formed on the third rigid substrate 23 are made to face each other and are screw-coupled with screws 81 and 82, and thereby the third rigid substrate 23 is fixed to the bottom face 32.

In addition, the supporting member 3 is provided with a penetration hole 37 that penetrates through the top face 31 and the bottom face 32, and an exterior appearance has a frame shape. In a state in which the third rigid substrate 23 is fixed to the bottom face 32, the angular velocity sensor 413 and the acceleration sensor 42 that are mounted on the front-side mounting face 231 are accommodated in the penetration hole 37. That is, the penetration hole 37 functions as an accommodation space of the angular velocity sensor 413 and the acceleration sensor 42, and therefore the penetration hole 37 contributes to reduction in size and thickness of the module. In addition, the penetration hole 37 also functions as a clearance portion that prevents the supporting member 3, and the angular velocity sensor 413 and the acceleration sensor 42 from being brought into contact with each other. When the penetration hole 37 is formed, an inner space of the supporting member 3 may be effectively used, and therefore the reduction in size (reduction in thickness) of the module 1 may be promoted.

Top Face 31

The top face 31 makes up a fixing face that fixes the fourth rigid substrate 24. The fourth rigid substrate 24 is fixed to the top face 31 in a state in which the front-side mounting face 241 faces the supporting member 3 side (inner side). Specifically, the supporting member 3 is provided with two screw holes 31a and 31b that are formed at two corner portions of the top face 31, which are in a diagonal relationship. The screw holes 31a and 31b and the hole portions 24a and 24b formed on the fourth rigid substrate 24 are made to face each other and are screw-coupled with screws 83 and 84, and thereby the fourth rigid substrate 24 is fixed to the top face 31.

In addition, as described above, the supporting member 3 is provided with the penetration hole 37. In a state in which the fourth rigid substrate 24 is fixed to the top face 31, the microcontroller 46 mounted on the front-side mounting face 241 is accommodated in the penetration hole 37. In addition, the penetration hole 37 also functions as a clearance portion that prevents the supporting member 3 and the microcontroller 46 from being brought into contact with each other. When the penetration hole 37 is formed, an inner space of the supporting member 3 may be effectively used, and therefore the reduction in size (reduction in thickness) of the module 1 may be promoted.

Hereinbefore, description has been made in detail with respect to the shape of the supporting member 3.

In addition, a constituent material of the supporting member 3 is not particularly limited, but for example, a hard material is preferable so as to prevent deformation occurred when a pressure is applied from the outside. According to this configuration, a state in which the bottom face 32, the side face 33, and the side face 34 are orthogonal to each other may be reliably maintained and therefore the detection accuracy of the module 1 may be maintained to be high.

This material is not particularly limited, but as this material, various kinds of metal such as iron, nickel, copper, and aluminum, or alloys or intermetallic compounds containing at least one kind among these kinds of metal, or oxides of these kinds of metal may be exemplified. For example, as the alloys, stainless steel, inconel, and in addition to these, for example, various aluminum-based alloys such as duralumin may be exemplified.

In this manner, when the supporting member 3 is formed of the metallic material, the following effect may be exhibited. That is, when the supporting member 3 is formed of a material having a high electrical conductivity like a metallic material, for example, radiation noise generated from a microcontroller 46 may be interrupted by the supporting member 3. Therefore, it is possible to prevent this radiation noise from reaching the angular velocity sensors 411 and 412 in the clearance portions 331 and 341 and having an adverse effect on the sensors. As a result, the angular velocity may be detected by the angular velocity sensors 411 and 412 with high accuracy.

In addition, as the hard material, in addition to the metallic materials, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene telephthalate (PET), and polybutylene telephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester, (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two kinds or more of these may be combined to be used.

In addition, as the constituent material of the supporting member 3, an elastic material that is capable of exhibiting a vibration-proof and vibration isolating function that absorbs unnecessary vibration is preferable. As this material, for example, various rubber materials (particularly, vulcanized rubber) such as natural rubber, isoprene rubber, butadiene rubber, styrene-butadiene rubber, nitrile rubber, chloroprene rubber, butyl rubber, acrylic rubber, ethylene-propylene rubber, silicone rubber, and fluoro-rubber, various kinds of thermoplastic elastomer such as styrene series, polyolefin series, polyvinyl chloride series, polyurethane series, polyester series, polyamide series, polybutadiene series, trans-polyisoprene series, fluoro-rubber series, and chlorinated polyethylene series may be exemplified, and one kind or two kinds or more of these may be combined to be used.

In addition, as the constituent material of the supporting member 3, vibration-isolating steel is preferably used so as to make a hard-to-deform property and the vibration-proof and vibration-isolating function to be compatible with each other.

Hereinbefore, description has been made with respect to the module 1.

In this module 1, the supporting member 3 is provided with three faces that are orthogonal to each other, that is, the bottom face 32, the side face 33, and the side face 34, and the third rigid substrate 23 on which the angular velocity sensor 413 is mounted is fixed to the bottom face 32, the first rigid substrate 21 on which the angular velocity sensor 411 is mounted is fixed to the side face 33, and the second rigid substrate 22 on which the angular velocity sensor 412 is mounted is fixed to the side face 34. In this manner, the three angular velocity sensors 411 to 413 may be disposed to be orthogonal to each other in a simple and reliable manner by only fixing the mounting substrate 2 to the supporting member 3. Therefore, according to the module 1, an angular velocity around the x-axis, the y-axis, and the z-axis may be accurately detected. That is, the three angular velocity sensors 411 to 413 may be disposed in a manner such that a detection axis of the angular velocity sensor 411 and the x-axis become parallel with each other, a detection axis of the angular velocity sensor 412 and the y-axis become parallel with each other, and a detection axis of the angular velocity sensor 413 and the z-axis become parallel with each other.

In addition, the angular velocity sensors 411 to 413, and the acceleration sensor 42 are positioned between the mounting substrate 2 and the supporting member 3. Therefore, the angular velocity sensor 411 is prevented from being exposed to the outside of the module 1 by the first rigid substrate 21, the angular velocity sensor 412 is prevented from being exposed to the outside of the module 1 by the second rigid substrate 22, and the angular velocity sensor 413 and the acceleration sensor 42 are prevented from being exposed to the outside of the module 1 by the third rigid substrate 23.

According to this arrangement, for example, at the time of manufacturing the module 1, or at the time of assembling the module 1 to another electronic apparatus, the angular velocity sensors 411 to 413 and the acceleration sensor 42 do not come into contact with a worker, a manufacturing apparatus, or the like, and therefore these sensors may be effectively prevented from being broken. In addition, as described above, an external magnetic field may be interrupted by the ground layer provided to the mounting substrate 2, such that the angular velocity and the acceleration may be detected by the sensors with good accuracy while the angular velocity sensors 411 to 413 and the acceleration sensor 42 are not affected by the magnetic field.

Particularly, the sensor devices 4 (the angular velocity sensors 411 to 413 and the acceleration sensor 42) are easily broken, and are susceptible to an effect of the magnetic field, such that when the sensor devices 4 are disposed as described above, both reliability and a detection characteristic of the module 1 may be improved.

In addition, the arrangement of the plurality of sensor devices 4 is not particularly limited as long as at least one of the sensor devices 4 is positioned between the mounting substrate 2 and the supporting member 3. For example, all of the sensor devices 4 excepting for the connector 49 may be mounted on the front-side mounting faces 211 to 251 of the rigid substrates 21 to 25, respectively, and may be positioned between the mounting substrate 2 and the supporting member 3.

Second Embodiment

Figure 7:
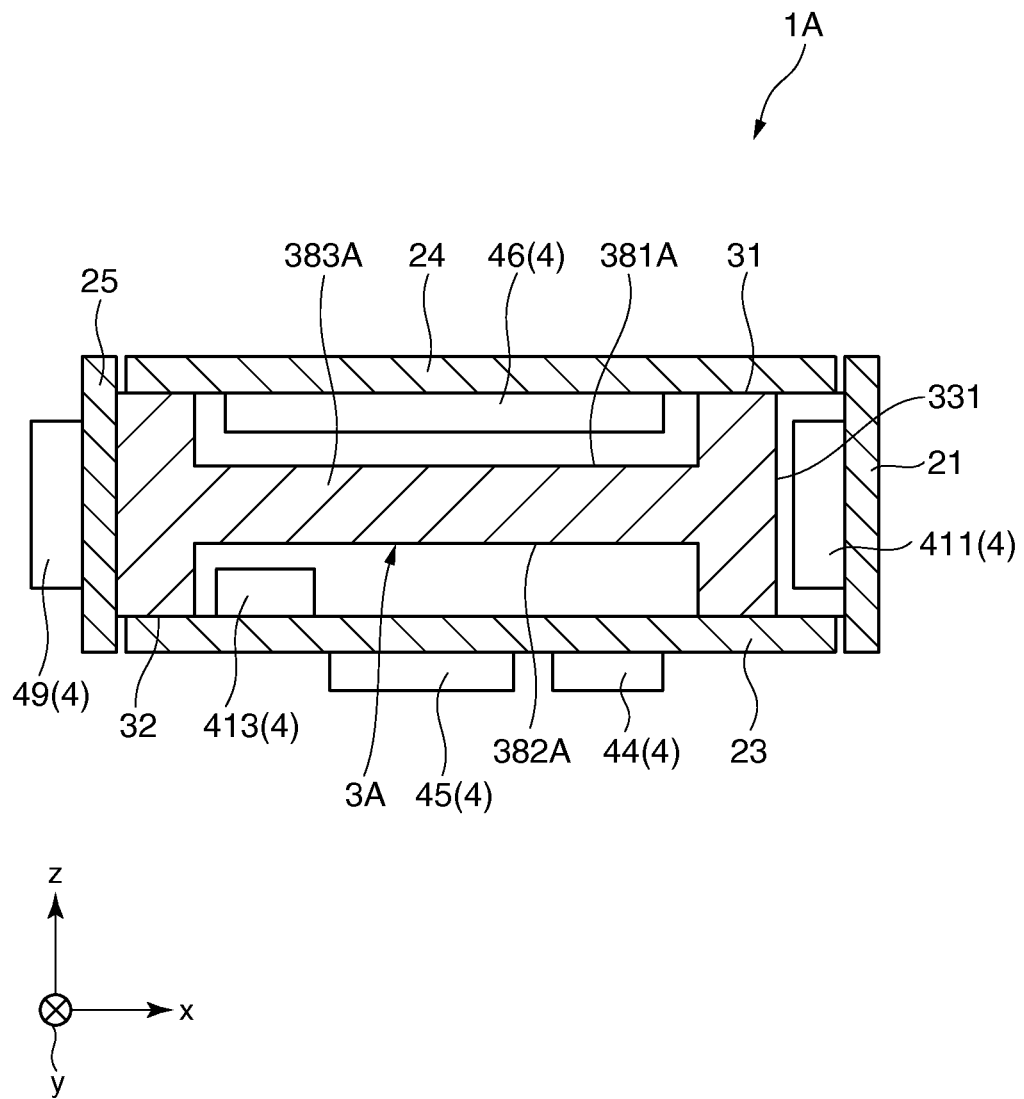
FIG. 7 is a cross-sectional view illustrating a module according to a second embodiment of the invention.

FIG. 7 shows a cross-sectional view of a module according to a second embodiment of the invention.

Hereinafter, the second embodiment will be mainly described based on a difference with the above-described embodiment, and description with respect to substantially the same configuration as the above-described embodiment will not be repeated.

The module according to the second embodiment of the invention is substantially the same as the first embodiment except that a configuration of the supporting member is different in each case. In addition, like reference numerals will be given to like parts having substantially the same functions as the first embodiment.

As shown in FIG. 7, a supporting member 3A provided to a module 1A includes a clearance portion (concave portion) 381A provided to the top face 31, and a clearance portion (concave portion) 382A provided to the bottom face 32. In other words, the supporting member 3A is provided with an interrupting portion 383A that interrupts on the way the penetration hole 37 provided in the first embodiment, and the supporting member 3A has a cross-section of an H-shape.

In a state in which the fourth rigid substrate 24 is fixed to the top face 31, the microcontroller 46 is accommodated in the clearance portion 381A. In addition, the clearance portion 381A may also function as a clearance portion that prevents the supporting member 3A and the microcontroller 46 from brought into contact with each other. When this clearance portion 381A is formed, an inner space of the supporting member 3A may be effectively utilized and therefore reduction in size (particularly, reduction in thickness) of the module 1 may be promoted.

In addition, in a state in which the third rigid substrate 23 is fixed to the bottom face 32, the angular velocity sensor 413 and the acceleration sensor 42 are accommodated in the clearance portion 382A. That is, the clearance portion 382A may function as a clearance portion that prevents the supporting member 3A, and the angular velocity sensor 413 and the acceleration sensor 42 from brought into contact with each other. When this clearance portion 382A is formed, an inner space of the supporting member 3A may be effectively utilized and therefore reduction in size (particularly, reduction in thickness) of the module 1 may be promoted.

In addition, as described above, a zenith face (face opposite to a face on which the second rigid substrate 22 is mounted) of the sensor device 4 and a surface of the clearance portion 341 of the supporting member 3A may be bonded with adhesive or the like. According to this configuration, the sensor device and the supporting member may be strongly bonded to each other.

In the supporting member 3A, the interrupting portion 383A functions as a reinforcing portion that suppresses deformation of the supporting member 3A, such that for example, the supporting member 3A has a configuration that is relatively difficult to deform compared to the supporting member 3 of the above-described first embodiment. Therefore, a state in which the angular velocity sensors 411 to 413 are orthogonal to each other may be maintained in a relatively reliable manner, and therefore the angular velocity sensors may exhibit a relatively excellent detection characteristic.

In addition, in this embodiment, the clearance portion 381A in which the microcontroller 46 is accommodated is spatially partitioned from the clearance portions 331, 341, and 382A in which the angular velocity sensors 411 to 413 are accommodated, respectively. Therefore, for example, when the supporting member 3A is formed of a material having a high electrical conductivity like a metallic material, for example, radiation noise generated from a microcontroller 46 may be interrupted by the supporting member 3A. Therefore, it is possible to prevent this radiation noise from reaching the angular velocity sensors 411 to 413 and having an adverse effect on the sensors. As a result, the angular velocity may be detected by the angular velocity sensors 411 to 413 with high accuracy.

In addition, as shown in FIG. 7, the first rigid substrate 21 may be supported by using side faces of the third rigid substrate 23 and the fourth rigid substrate 24 without being directly supported by the supporting member 3A. In this aspect, when the length of the third rigid substrate 23 and the fourth rigid substrate 24 in the x-axis direction is made to be larger than the length in the x-axis direction of the supporting member 3A, a space between the third rigid substrate 23 and the fourth rigid substrate 24 is made to function as a clearance portion. In this manner, the rigidity of the supporting member may be raised compared to a configuration in which a clearance portion is formed in a side wall of the supporting member 3A. In addition, this aspect may be applied to another embodiment without being limited to this embodiment.

Third Embodiment

Figure 8:
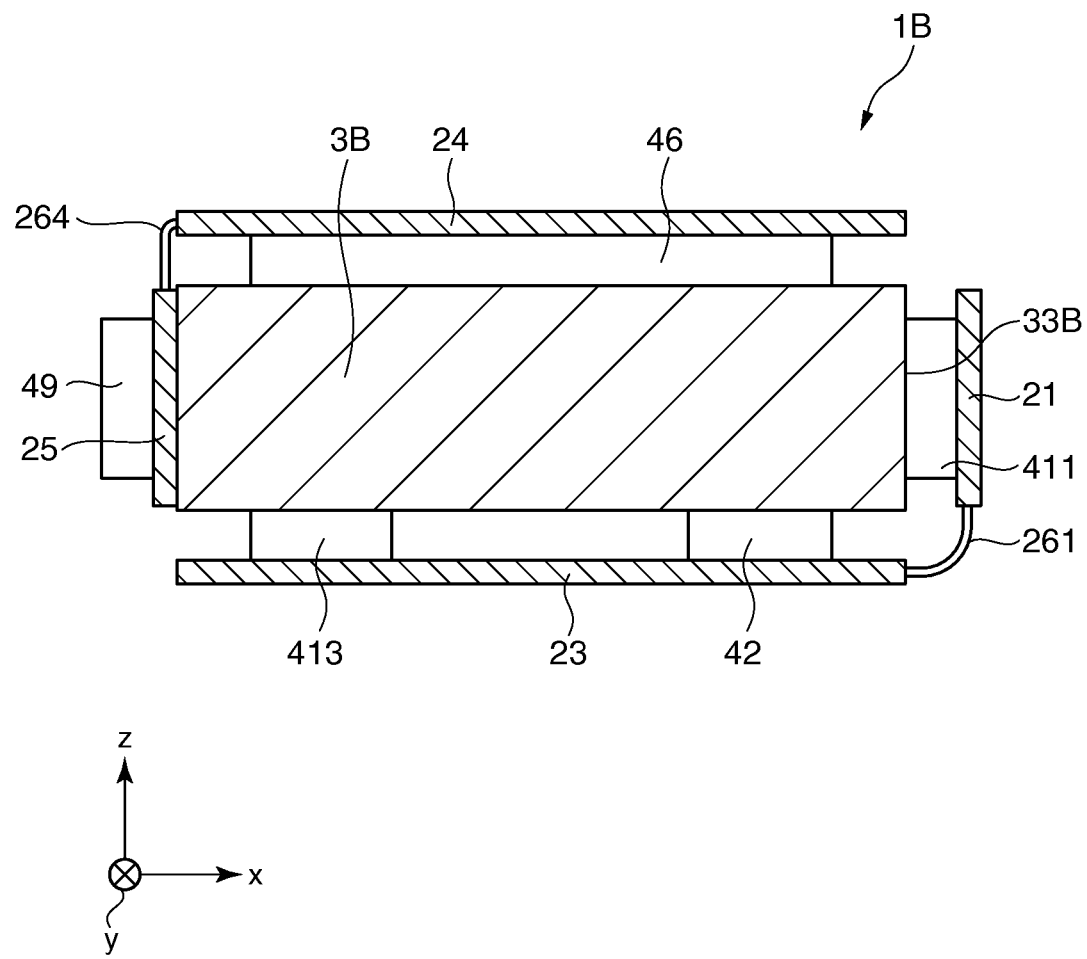
FIG. 8 is a cross-sectional view illustrating a module according to a third embodiment of the invention.

FIG. 8 shows a cross-sectional view of a module according to a third embodiment of the invention.

Hereinafter, the third embodiment will be mainly described based on a difference with the above-described embodiments, and description with respect to substantially the same configuration as the above-described embodiments will not be repeated.

The module according to the third embodiment of the invention is substantially the same as the first embodiment except that a configuration of the supporting member is different in each case. In addition, like reference numerals will be given to like parts having substantially the same functions as the first embodiment.

As shown in FIG. 8, the supporting member 3B provided to the module 1B has a block shape of a substantially rectangular parallelepiped. In addition, the mounting substrate 2 is disposed so as to cover the outer periphery of the supporting member 3B.

In this module 1B, the mounting substrate 2 is fixed to supporting member 3B through the sensor devices 4 mounted on the front-side mounting faces 211 to 251 of the mounting substrate 2. That is, the first rigid substrate 21 is fixed to the supporting member 3B by fixing the angular velocity sensor 411 mounted on the front-side mounting face 211 to a side face 33B of the supporting member 3B. The fixing of the angular velocity sensor 411 to the side face 33B is not particularly limited, and may be performed, for example, using adhesive. This is true of other second to fourth rigid substrates 22 to 24. In addition, in regard to the fifth rigid substrate 25, since the sensor device 4 is not mounted on the front-side mounting face 251, the fifth rigid substrate 25 is directly fixed to the side face 35.

2. Electronic Apparatus

Figure 9:
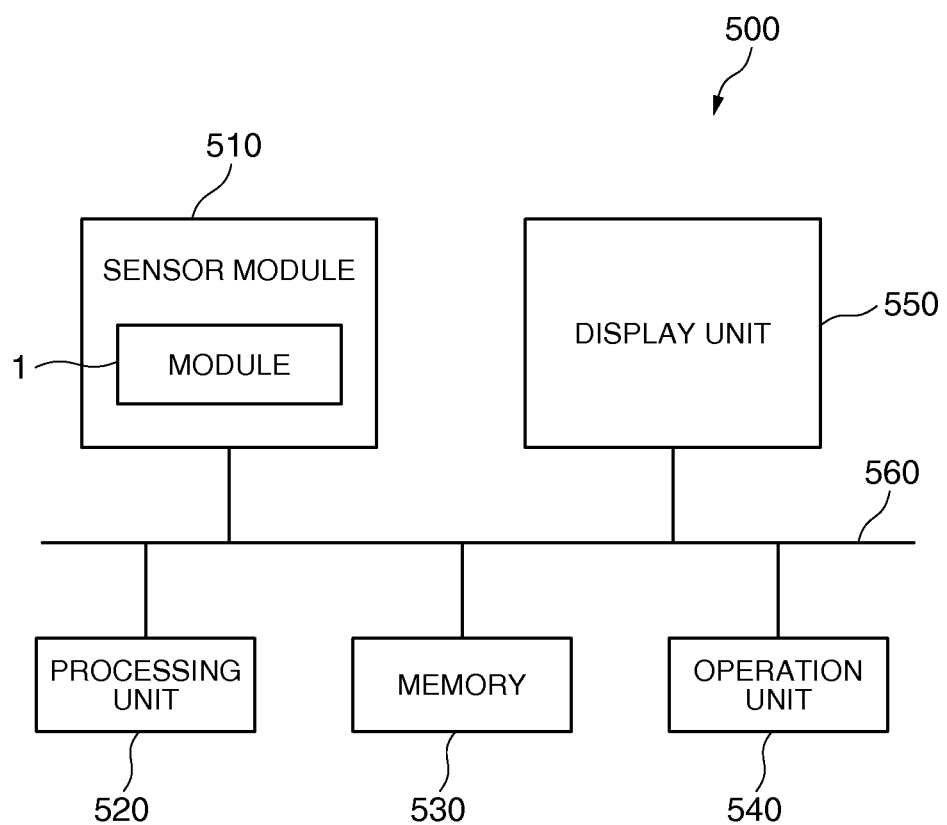
FIG. 9 is a view illustrating an example of a configuration of an electronic apparatus in which a module is mounted.

The above-described module 1 (also, 1A and 1B) may be assembled into various electronic apparatus. Hereinafter, an electronic apparatus according to the invention in which the module 1 is mounted will be described. FIG. 9 shows a view illustrating an example of a configuration of an electronic apparatus 500 in which the module 1 is mounted. The electronic apparatus 500 is not particularly limited, and for example, a digital still camera, a video camera, a car navigation system, a cellular phone, a mobile PC, a robot, a gaming machine, a game controller, or the like may be exemplified.

The electronic apparatus 500 shown in FIG. 9 includes a sensor module 510 provided with the module 1, a processing unit 520, a memory 530, an operation unit 540, and a display portion 550. These are connected to each other by a bus 560. The processing unit (CPU, MPU, or the like) 520 performs a control of the sensor module 510 or the like, or an entire control of the electronic apparatus 500. In addition, the processing unit 520 performs processing on the basis of angular velocity information detected by the sensor module 510. For example, the processing unit 520 performs processing for camera shake correction, a posture control, GPS autonomous navigation, or the like on the basis of the angular velocity information. The memory 530 stores a control program or various pieces of data, and functions as a work area or a data storing area. The operation unit 540 allows a user to operate the electronic apparatus 500. The display unit 550 displays various kinds of information to the user.

Hereinbefore, description has been made with respect to the module and electronic apparatus according to the invention on the basis of embodiments shown in the drawings, but the invention is not limited to these, and configurations of respective portions may be substituted with arbitrary configurations having substantially the same functions. The other arbitrary constituents may be added to the invention. Further, respective embodiments may be appropriately combined.

In addition, in the above described embodiments, description has been made with respect to a configuration in which the rigid and flexible substrate is used as the mounting substrate, but the configuration of the mounting substrate is not limited to this, and for example, the mounting substrate may be configured by a plurality of separate rigid substrate (5 sheets of rigid substrate). In this case, for example, the respective rigid substrates may be fixed to the supporting member and then these rigid substrates may be electrically connected to each other using a connector or the like.

In addition, in the above-described embodiments, description has been made with respect to an example in which the vertical lines of the first fixing face and the second fixing face of the supporting member are orthogonal to each other, but it is not necessarily limited to this example. For example, the supporting member may be formed of a triangular pyramid shape and the mounting substrates may be disposed along side faces of the triangular pyramid.

The entire disclosure of Japanese Patent Application No. 2011-122790, filed May 31, 2011 is expressly incorporated by reference herein.

What is claimed is:

1. A module comprising:
   a sensor device;
   a mounting substrate that has a plurality of mounting faces, a portion between the mounting faces adjacent to each other being foldable to manipulate an angle between the mounting faces; and
   a supporting member having a plurality of fixing faces,
   wherein at least one of the plurality of fixing faces is provided with a clearance portion,
   the sensor device and one of the plurality of fixing faces are bonded directly to each other,
   the sensor device is disposed on a supporting member side of the mounting faces and at least a part of the sensor device is accommodated in the clearance portion,
   each of the mounting faces is disposed along each of the fixing faces, and
   the mounting substrate surrounds an exterior of the supporting member.

2. The module according to claim 1,
wherein normal lines of the fixing faces in the supporting member intersect each other.

3. The module according to claim 1,
wherein normal lines of the fixing faces in the supporting member are orthogonal to each other.

4. The module according to claim 1,
wherein the supporting member is a rectangular parallelepiped.

5. The module according to claim 1,
wherein the supporting member is provided with a penetration hole, and at least a part of the sensor device is accommodated in the penetration hole.

6. The module according to claim 1,
wherein a protruding portion is provided on at least one of the plurality of mounting faces and one of the plurality of fixing faces, and a hole portion is provided on another one of the plurality of mounting faces and another one of the plurality of fixing faces, and
the protruding portion and the hole portion engage with each other.

7. The module according to claim 1,
wherein a metallic material is used for the supporting member.

8. The module according to claim 1,
wherein a hard substrate is used as the mounting faces, and a flexible substrate is connected between the mounting faces.

9. The module according to claim 1,
wherein the mounting faces include a first mounting face, a second mounting face, and a third mounting face,
the sensor device is one of a plurality of sensor devices, and
each of the plurality of sensor devices is mounted on a separate one of the first to third mounting faces, and detection axes of the sensor devices intersect each other.

10. The module according to claim 9,
wherein the sensor device is an angular velocity sensor or an acceleration sensor.

11. An electronic apparatus comprising:
the module according to claim 1.

\* \* \* \* \*